(12) United States Patent
Tamura

(10) Patent No.: US 8,319,843 B2
(45) Date of Patent: Nov. 27, 2012

(54) IMAGE PROCESSING APPARATUS AND METHOD FOR BLUR CORRECTION

(75) Inventor: Nobuhiko Tamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 306 days.

(21) Appl. No.: 12/762,741

(22) Filed: Apr. 19, 2010

(65) Prior Publication Data

US 2010/0271495 A1 Oct. 28, 2010

(30) Foreign Application Priority Data

Apr. 22, 2009 (JP) ................. 2009-104548

(51) Int. Cl.
*H04N 5/228* (2006.01)
(52) U.S. Cl. ................. 348/208.99
(58) Field of Classification Search .......... 348/241, 348/193, 155, 208.13, 208.14
See application file for complete search history.

(56) References Cited

U.S. PATENT DOCUMENTS

| 5,729,631 | A | 3/1998 | Wober et al. |
| 5,841,911 | A | 11/1998 | Kopeika et al. |
| 7,899,314 | B2 * | 3/2011 | Kubo ............................. 396/55 |
| 8,018,504 | B2 * | 9/2011 | Kelly ............................. 348/241 |
| 2005/0025377 | A1 | 2/2005 | Avinash et al. |
| 2005/0280869 | A1* | 12/2005 | Kameyama ............... 358/3.01 |
| 2006/0029287 | A1 | 2/2006 | Hayashi et al. |
| 2007/0263111 | A1 | 11/2007 | Satodate |

* cited by examiner

*Primary Examiner* — Usman Khan
(74) *Attorney, Agent, or Firm* — Fitzpatrick, Cella, Harper & Scinto

(57) ABSTRACT

A capturing parameter and a capturing image are obtained by an image capturing device which uses the capturing parameter. Correction data, which corresponds to an optical transfer function of the image capturing device derived from the capturing parameter, and a noise amount of the capturing image dependent on the capturing parameter, is acquired to correct a blur of the capturing image. A first degree of correction by the correction data for a high noise amount is less than a second degree of correction by the correction data for a low noise amount.

11 Claims, 15 Drawing Sheets

| STOP | PIXEL POSITION | ZOOM POSITION | NOISE AMOUNT | CORRECTION COEFFICIENT |
|---|---|---|---|---|
| 2.4 | 0.7 | 1.0 | 0.1 | $\begin{bmatrix} 0 & -1 & 0 \\ -1 & 3 & -1 \\ 0 & -1 & 0 \end{bmatrix}$ |
| ⋮ | ⋮ | ⋮ | ⋮ | ⋮ |
| | | | | |

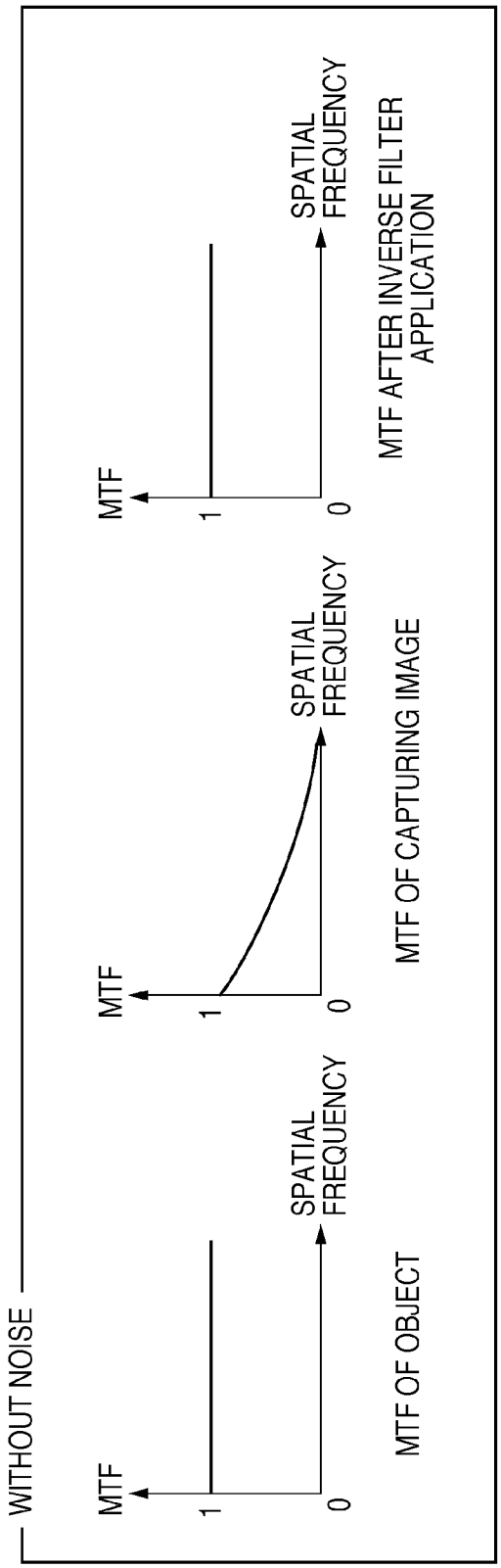

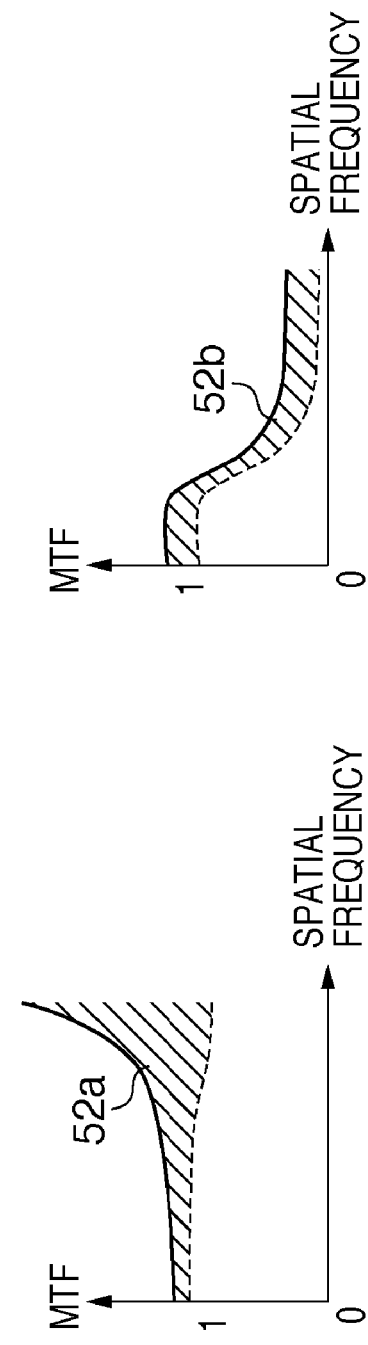

F I G. 13

| TEMPERATURE | EXPOSURE AMOUNT | EXPOSURE TIME | ISO SENSITIVITY | NOISE AMOUNT |
|---|---|---|---|---|
| 40 | 5 | 1.0 | 200 | 5 |
| ... | ... | ... | ... | ... |

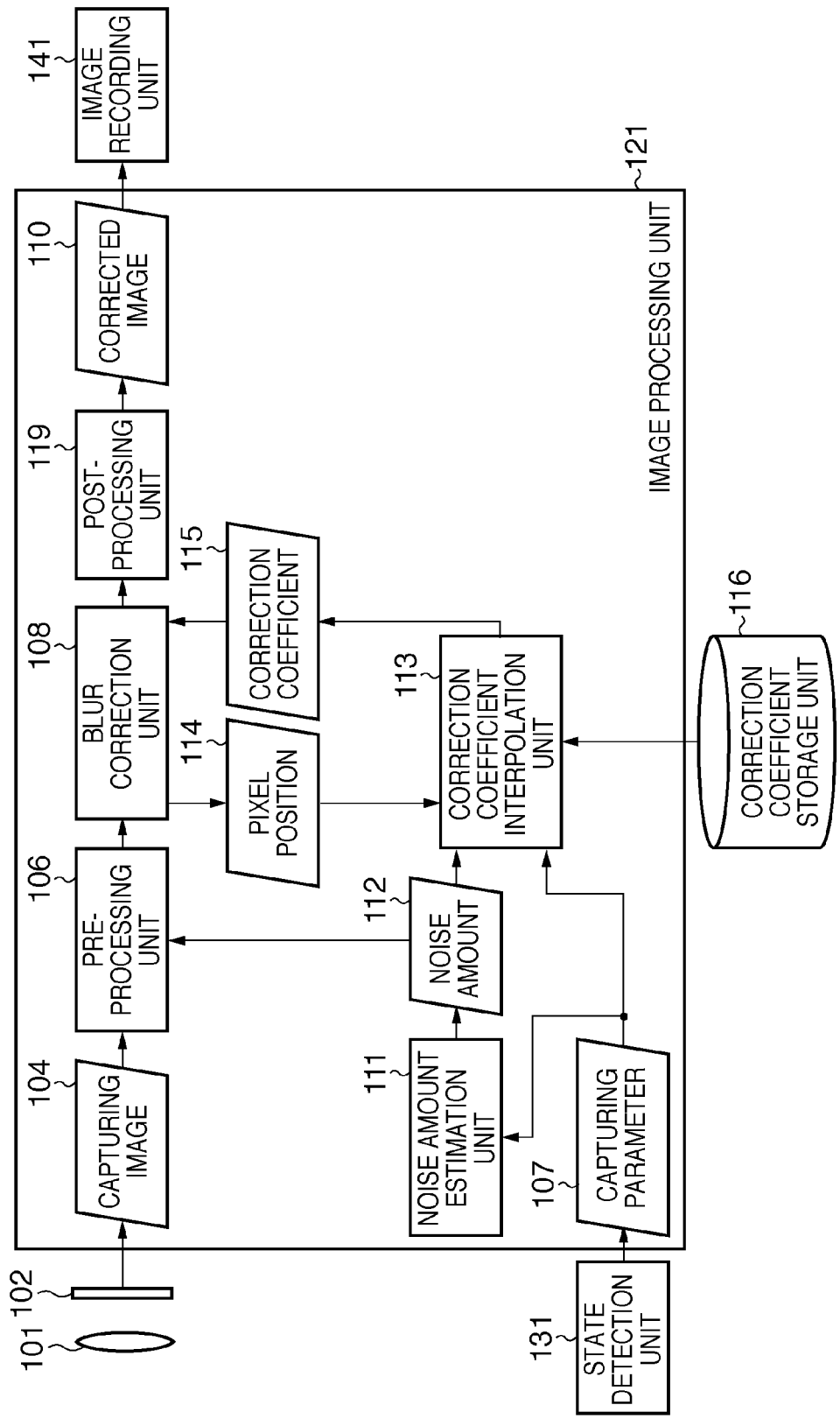

IMAGE PROCESSING APPARATUS AND METHOD FOR BLUR CORRECTION

BACKGROUND OF THE INVENTION

1. Field of the Invention

The present invention relates to an image processing apparatus and image processing method which correct a blur of a capturing image caused by an imaging optical system.

2. Description of the Related Art

In an image capturing apparatus such as a digital still camera or digital video camera, an imaging optical system formed from a lens and the like guides light from an object onto a CCD or CMOS sensor serving as an image capturing device so as to form an image. The image capturing device converts the received light into an electrical signal. The electrical signal undergoes processing such as analog-to-digital (A/D) conversion and demosaicing necessary for converting an electrical signal into image data, thereby obtaining a capturing image.

Since the light arriving at the image capturing device has passed through the imaging optical system, the image capturing device influences the image quality of the capturing image. For example, when a high-power lens is used, a capturing image having a high resolution to its peripheral region can be obtained. On the other hand, if a low-cost low-power lens is used, the resolution of the capturing image conspicuously degrades especially in the peripheral region.

For example, when taking a picture of a starry sky, an image captured by a high-power lens shows each star almost as a point image. In an image captured by a low-power lens, however, each star does not appear as a point image but blurs. When taking a picture of a person, the use of a high-power lens enables one to obtain an image in which each hair is distinct. However, a low-power lens only obtains an image with a blurry mass of hair. That is, an image without definition is obtained by the low-power lens.

Such a blur depends on the characteristics of the imaging optical system and occurs even in an in-focus state. In other words, the resolution of the capturing image changes depending on the performance of the lens even in an in-focus state.

There is a method of correcting an image blur caused by the imaging optical system by performing image processing for the capturing image. In this method, image processing is executed based on the blur characteristic of the imaging optical system, which has been acquired as data in advance, thereby correcting an image blur caused by the imaging optical system.

To obtain the blur characteristic of the imaging optical system as data, for example, a PSF (Point Spread Function) is used. The PSF represents how a point of an object blurs. For example, a luminous body (point source) having a very small volume is captured via an imaging optical system in darkness. If an ideal imaging optical system is used, the light forms a point image on the surface (light-receiving surface) of the image capturing device. However, if an imaging optical system that yields a large blur is used, the light forms not a point image but an image spreading to some extent on the light-receiving surface. That is, the two-dimensional distribution of the light on the light-receiving surface corresponds to the PSF of the imaging optical system. When acquiring the PSF of the imaging optical system in actuality, it is not always necessary to capture an object such as a point source. Based on an image obtained by capturing, for example, a chart with white and black edges, the PSF can be calculated using a calculation method corresponding to the chart.

A method of using an inverse filter is known as a method of correcting an image blur by the PSF. Assume a case in which a point source is captured in darkness for the descriptive convenience. When an imaging optical system with a blur is used, light emitted by the point source forms a light distribution spreading to some extent on the light-receiving surface. The image capturing device converts the light into an electrical signal. The electrical signal is converted into image data, thereby obtaining a digital image of the point source. In the image obtained using the imaging optical system with a blur, not only one pixel corresponding to the point source has a significant, non-zero pixel value. Pixels in the neighborhood also have significant pixel values close to zero. Image processing of converting this image into an image having significant pixel values almost at one point is inverse filtering. The inverse filter allows to obtain an image as if it were captured using an imaging optical system with little blur.

A point source has been exemplified above for the sake of explanation. Regarding light from an object as an aggregate of a number of point sources, the blur of light coming from or reflected by each point of the object is eliminated, thereby obtaining an image with little blur even for an object other than a point source.

A detailed method of forming the inverse filter will be described next. A capturing image obtained using an ideal blur-free imaging optical system is defined as f(x,y), where x and y are two-dimensional pixel positions on the image, and f(x,y) is the pixel value of the pixel (x,y). A capturing image obtained using an imaging optical system with a blur is defined as g(x,y). The PSF of the imaging optical system with a blur is represented by h(x,y). Then, f, g, and h have a relation given by $$g(x,y) = h(x,y) * f(x,y) \quad (1)$$

where * represents a convolution operation.

Correcting an image blur (to be referred to as blur correction hereinafter) amounts to estimating f obtained by the blur-free imaging optical system based on the image g obtained using the imaging optical system with a blur and h that is the PSF of the imaging optical system. When Fourier transformation is applied to equation (1) to obtain an expression in the spatial frequency domain, it can be written as a product for each frequency as given by $$G(u,v) = H(u,v) \cdot F(u,v) \quad (2)$$

where

H is an OTF (Optical Transfer Function) that is the Fourier transform of the PSF, u is the spatial frequency in the x direction, v is the spatial frequency in the y direction, G is the Fourier transform of g, and F is the Fourier transform of f.

To obtain the blur-free capturing image f from the blurred capturing image g, both sides of equation (2) are divided by H as per $$G(u,v)/H(u,v) = F(u,v) \quad (3)$$

F(u,v) obtained by equation (3) is inversely Fourier-transformed to the real space to obtain the blur-free image f(x,y). Let R be the inverse Fourier transform of 1/H. Convolution is performed in the real space to obtain a blur-free image by $$g(x,y) * R(x,y) = f(x,y) \quad (4)$$

R(x,y) of equation (4) is called an inverse filter. Actually, since a division by a divisor 0 occurs at the frequency (u,v) at which H(u,v) is zero, the inverse filter R(x,y) requires a slight modification.

Normally, the higher the frequency is, the smaller the value of the OTF is. The higher the frequency is, the larger the value of the inverse filter that is the reciprocal of the OTF is. Hence, convolution of the capturing image using the inverse filter enhances the high-frequency components of the capturing image, that is, noise (noise is a high-frequency component in general) contained in the capturing image. A method is known to impart a characteristic which does not enhance high-frequency components as much as the inverse filter by modifying R(x,y). A Wiener filter is famous as a filter that does not enhance high-frequency components so much in consideration of noise reduction.

As described above, it is impossible to completely remove a blur because of noise contained in the capturing image or a departure from an ideal condition such as existence of a frequency at which the OTF is zero. However, the above-described processing can reduce the blur. Note that filters such as an inverse filter and a Wiener filter to be used for blur correction will be referred to together as a "recovery filter" hereinafter. As a characteristic feature of the recovery filter, it performs image processing using the PSF of the imaging optical system, as described above.

To construct a Wiener filter, the OTF and noise amount of the imaging optical system are used. That is, as a characteristic feature, the Wiener filter is formed using the PSF or OTF and noise amount of the imaging optical system.

Note that the inverse filter and Wiener filter have been mentioned as the method of correcting a blur of the imaging optical system. Blur correction methods such as the maximum entropy method and Richardson-Lucy method have also been proposed in addition to those filters. They are equal to the Wiener filter in the sense that processing is performed based on the OTF or PSF and the noise amount to correct a blur of a capturing image and obtain a corrected image, although a detailed description thereof will be omitted.

Generally, frequency components contained in a capturing image are enhanced in blur correction. Since a capturing image contains noise, blur correction enhances the frequency components of the noise as well. For this reason, if the degree of blur correction is strong, noise also increases. To avoid the increase of noise, the degree of blur correction needs to be weakened. That is, the degree of blur correction and noise increase have a tradeoff relationship.

The Wiener filter is one of filters that implement optimum balance between the degree of blur correction and noise increase. More specifically, correction using a Wiener filter gives a corrected image closest in terms of square error to a capturing image containing neither noise nor a blur by the imaging optical system. That is, the Wiener filter performs correction in consideration of both noise increase and the degree of blur correction and can therefore maintain appropriate balance between noise increase and the degree of blur correction.

As described above, the Wiener filter can be calculated from the OTF and noise amount. Conventionally, the Wiener filter is constructed based on a noise amount measured under a predetermined capturing condition or an empirically defined noise amount. However, the noise amount varies in accordance with the capturing condition, and therefore, the noise amount measured under a predetermined capturing condition or the empirically defined noise amount is not accurate. As a result, the conventional Wiener filter does not necessarily have an optimum structure.

As an example of a noise amount variation according to the capturing condition, the temperature of the image capturing device rises so as to increase noise upon continuous shooting. A Wiener filter formed based on a noise amount smaller than the actual noise amount increases the noise of a capturing image more than necessary. Conversely, a Wiener filter formed based on a noise amount larger than the actual noise amount weakens the degree of blur correction more than necessary. In other words, blur correction based on an incorrect noise amount leads to insufficient correction or excessive noise.

In the above-described blur correction methods such as the maximum entropy method and Richardson-Lucy method as well, the degree of blur correction and noise increase have a tradeoff relationship. Hence, if no accurate noise amount is obtained, optimum blur correction cannot be done.

SUMMARY OF THE INVENTION

In one aspect, an image processing apparatus comprising: a first acquisition section, configured to acquire a capturing parameter and a capturing image obtained by an image capturing device which uses the capturing parameter; a second acquisition section, configured to acquire, corresponding to (a) an optical transfer function of the image capturing device derived from the capturing parameter, and (b) a noise amount of the capturing image dependent on the capturing parameter, correction data to correct a blur of the capturing image, wherein a first degree of correction by the correction data for a high noise amount is less than a second degree of correction by the correction data for a low noise amount.

According to the aspect, it is possible to acquire correction data for blur correction corresponding to the noise amount of a capturing image. It is also possible to perform blur correction while balancing noise increase and the degree of blur correction well.

Further features of the present invention will become apparent from the following description of exemplary embodiments with reference to the attached drawings.

BRIEF DESCRIPTION OF THE DRAWINGS

FIGS. 5A to 5C are graphs schematically showing the relationship between the noise amount and blur correction.

FIG. 13 is a table showing the concept of a noise characteristic storage unit.

FIG. 14 is a block diagram showing the arrangement of an image capturing apparatus according to the fifth embodiment.

DESCRIPTION OF THE EMBODIMENTS

An image processing apparatus and image processing method according to the embodiments of the present invention will now be described in detail with reference to the accompanying drawings.

First Embodiment

[Arrangement of Apparatus]

Figure 1:
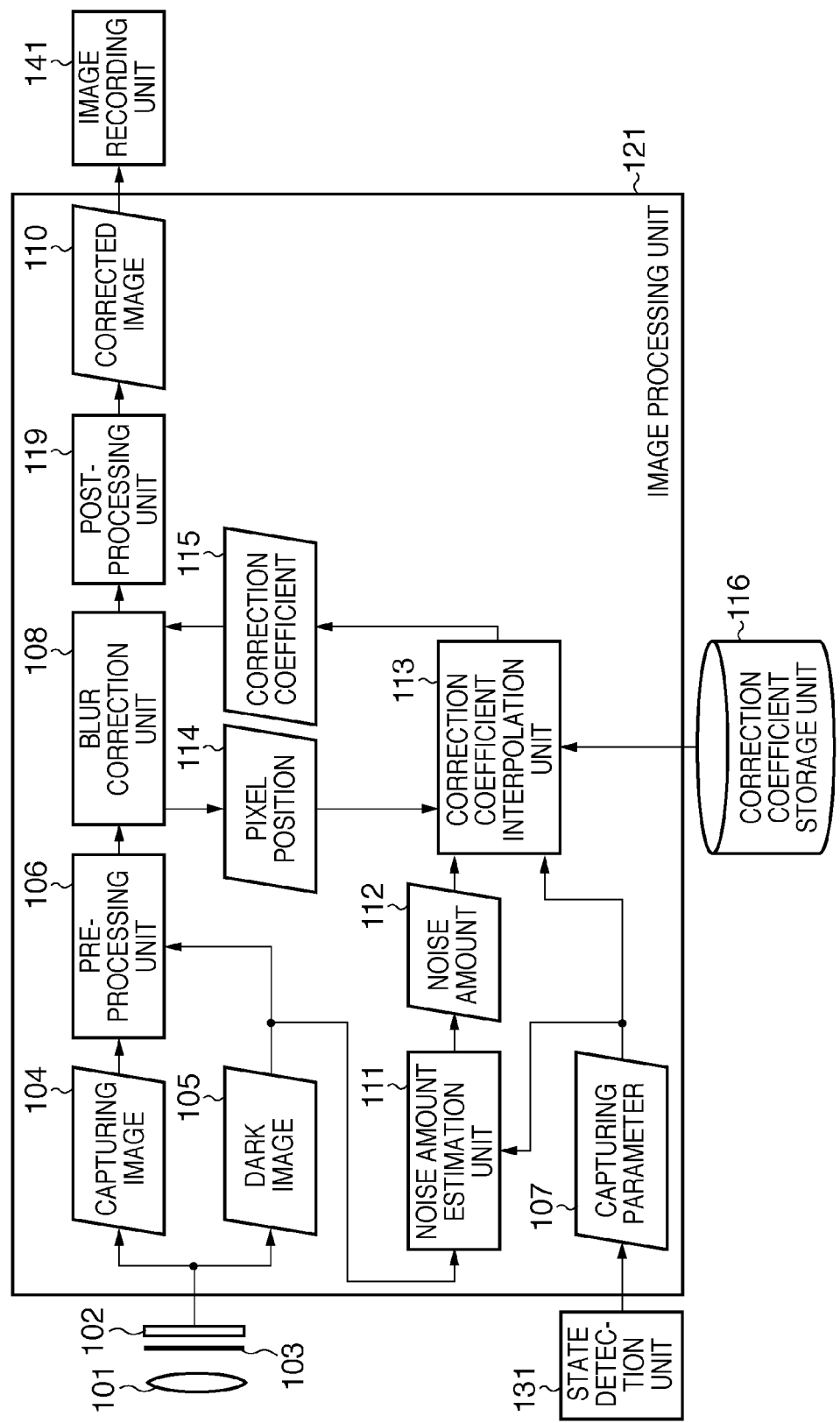
FIG. 1 is a block diagram showing the arrangement of an image capturing apparatus according to an embodiment.

FIG. 1 is a block diagram showing the arrangement of an image capturing apparatus according to the embodiment.

Light from an object (not shown) passes through an imaging optical system 101 and forms an image on the light-receiving surface of an image capturing device 102. The image capturing device 102 converts the light that forms an image on the light-receiving surface into an electrical signal. An A/D converter (not shown) converts the electrical signal into a digital signal, thereby obtaining a capturing (captured) image 104.

The image capturing device 102 is formed from a CCD or CMOS sensor which converts the optical signal of the image formed on the light-receiving surface into an electrical signal for each of photoelectric conversion elements arranged on the light-receiving surface. A shade unit 103 has a function of blocking off the light from the object not to make it reach the light-receiving surface of the image capturing device 102. The shade unit 103 may be, for example, a shutter or a stop if it can block off light in the aperture state stopped down to its limit. Note that to capture an image of an object, the shade unit 103 is kept open for a predetermined time. That is, light from the object is never entirely blocked off during the capturing time.

A state detection unit 131 acquires capturing parameters, that is, a series of parameters representing the capturing state of the image capturing apparatus. Examples of the capturing parameters are a lens identifier, body identifier, stop value, object distance, zoom position, and ISO sensitivity. The capturing parameters specify the capturing characteristics (the characteristics of the imaging optical system 101 and the characteristics of the image capturing device 102) in the capturing state. That is, the capturing parameter varies in dependence upon use of the imaging optical system. The capturing parameters represent real time (current) characteristics of the image capturing apparatus. Acquiring capturing parameters in this way facilitates accurate calculation of noise in a captured image and as a consequence, the captured image can be corrected in an accurate manner in order to remove image artifacts such as blur and noise. This is in contrast to the conventionally known technique mentioned in the background discussion, which uses predetermined capturing parameters to calculate noise in a captured image. However, noise varies in dependence on the capturing parameter and therefore noise calculated using a predetermined capturing parameter (or empirically defined noise) is not accurate.

In an image processing unit 121, a noise amount estimation unit 111 (to be described later in detail) estimates a noise amount 112 using a dark image 105. A preprocessing unit 106 (to be described later in detail) executes preprocessing of blur correction for the capturing image 104 using the dark image 105. A blur correction unit 108 notifies a correction coefficient interpolation unit 113 of a pixel position 114 of a correction target, and corrects, using correction coefficients 115 returned from the correction coefficient interpolation unit 113, the blur of the capturing image 104 input from the preprocessing unit 106.

Based on the noise amount 112 and a capturing parameter 107, the correction coefficient interpolation unit 113 acquires, from a correction coefficient storage unit 116, the correction coefficients 115 corresponding to the pixel position 114 sent from the blur correction unit 108, and returns the correction coefficients 115 to the blur correction unit 108. A post-processing unit 119 performs post-processing such as color conversion and gain adjustment for the blur-corrected capturing image input from the blur correction unit 108, and outputs a corrected image 110. An image recording unit 141 records the corrected image 110 on a recording medium such as a memory card.

[Processing of Image Processing Unit]

Figure 2:
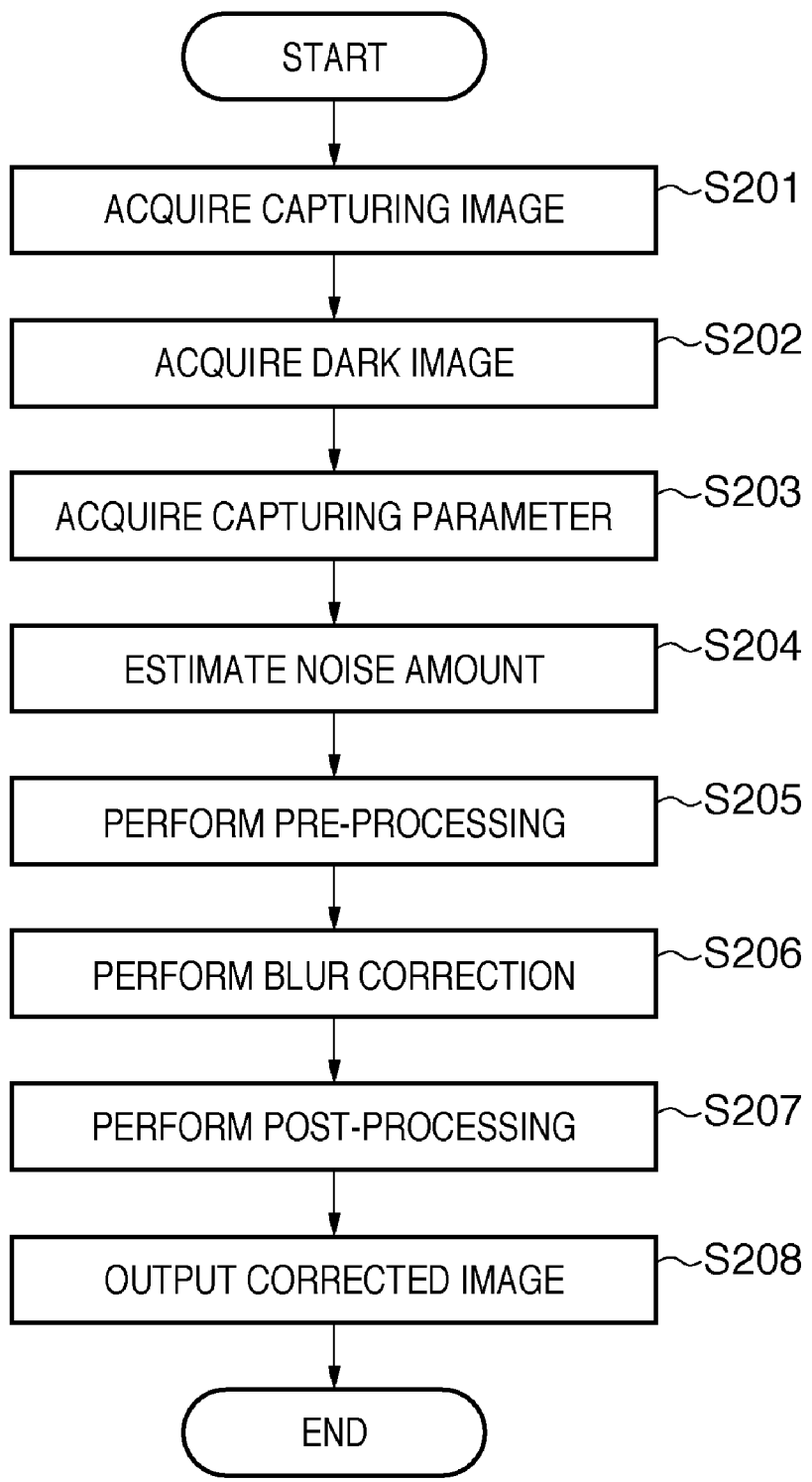
FIG. 2 is a flowchart for explaining image processing of an image processing unit.

FIG. 2 is a flowchart for explaining image processing of the image processing unit 121.

The image processing unit 121 acquires the capturing image 104 (S201) and the dark image 105 (S202).

The dark image 105 is data obtained by causing the shade unit 103 to block off light from the object and A/D-converting an electrical signal output from the image capturing device 102. The electrical signal output from the image capturing device 102 normally contains noise. Even in the shaded state, the value of the electrical signal output from the image capturing device 102 is not zero. That is, not all the pixel values of the dark image 105 are zero, and the pixels have certain values. In other words, noise defines the pixel values of the dark image 105. The dark image 105 has information representing the noise characteristic of the image capturing device 102.

Figures 3, 4:
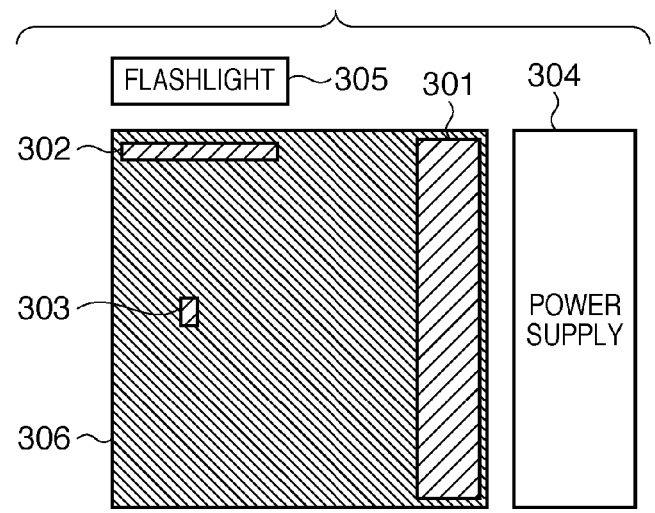
FIG. 3 is a view for explaining an example of the characteristic of a dark image.
FIG. 4 is a table showing the concept of a correction coefficient storage unit.

FIG. 3 is a view for explaining an example of the characteristic of a dark image.

Reference numeral 306 denotes a light-receiving surface of the image capturing device 102, which corresponds to the dark image 105. Noise of the photoelectric conversion elements in a region 301 near a power supply 304 tends to grow due to the heat of the power supply 304. For this reason, the pixel values in the region 301 of the dark image 105 tend to be larger than the average pixel value of the overall dark image 105.

When a flashlight 305 emits light, noise of the photoelectric conversion elements in a region 302 close to the flashlight 305 also grows due to heat. Hence, the pixel values in the region 302 of the dark image 105 tend to be larger than the average pixel value of the overall dark image 105.

A region 303 of the image capturing device 102 sometimes has a noise characteristic different from that in other regions because of pixel defects or the like. That is, as a characteristic feature, the pixel values of the dark image 105 change between the regions.

The capturing image 104 also contains similar noise. However, it is difficult to estimate the noise characteristic from the capturing image 104 because the capturing image 104 contains both object information and noise information. That is, acquiring the dark image 105 in addition to the capturing image 104 of the object gives an estimate of the noise amount in the capturing image 104.

Next, the image processing unit 121 acquires the capturing parameter 107 from the state detection unit 131 (S203). When the capturing parameter 107 is decided, the OTF of the imaging optical system 101 can be obtained by measurement or simulation. Since the OTF of the imaging optical system 101 changes depending on the capturing parameter 107, acquisition of the capturing parameter 107 is indispensable to correct the blur of the imaging optical system 101.

The image processing unit 121 then causes the noise amount estimation unit 111 to estimate the noise amount 112 from the dark image 105 (S204), and causes the preprocessing unit 106 to execute preprocessing (S205) (to be described later in detail). The blur correction unit 108 performs processing (blur correction) of reducing the blur of the capturing image 104 after the preprocessing using the correction coefficients 115 acquired via the correction coefficient interpolation unit 113 (S206).

The image processing unit 121 causes the post-processing unit 119 to execute post-processing for the blur-corrected capturing image (S207), and outputs the corrected image 110 after the post-processing to the image recording unit 141 (S208) to record the corrected image 110 on a recording medium.

[Noise Amount Estimation Unit]

The noise amount estimation unit 111 divides the dark image 105 into a plurality of regions, and calculates the standard deviation of the pixel values in each region. In a region where the noise amount is large, the standard deviation is large. In a region where the noise amount is small, the standard deviation is small. That is, it is possible to accurately grasp the noise amount that changes between the regions, as described with reference to FIG. 3, by calculating the standard deviation in each region.

When the ISO sensitivity is high, normally, processing of amplifying the pixel values of the capturing image 104 is performed. For this reason, the preprocessing unit 106 or post-processing unit 119 amplifies the pixel values of the capturing image 104 which has been obtained while setting the ISO sensitivity high. Noise contained in the capturing image 104 is also amplified in accordance with the set ISO sensitivity. It is therefore impossible to simply use the standard deviation obtained from the dark image 105 intact as the noise amount of the capturing image 104. Instead, the standard deviation obtained from the dark image 105 is amplified at a predetermined ratio corresponding to the set ISO sensitivity, and the amplification result is used as the actual noise amount 112.

Note that the standard deviation is used as the noise amount 112 in the above-described example. A pixel value variance or the difference between the maximum value and the minimum value can also serve as an indicator representing the magnitude of noise because they become larger as the noise increases and smaller as the noise decreases. Hence, not the standard deviation but the variance or the difference between the maximum value and the minimum value may be used as the noise amount 112.

[Correction Coefficient Interpolation Unit]

The correction coefficient interpolation unit 113 acquires the correction coefficients 115 for blur correction corresponding to the noise amount 112, capturing parameter 107, and pixel position 114. The noise amount 112, capturing parameter 107, and pixel position 114 are information necessary for acquiring the correction coefficients 115. An example will be explained below in which blur correction is performed using a Wiener filter. Note that in blur correction using a Wiener filter, the correction coefficients 115 are the coefficients of the Wiener filter.

FIG. 4 is a table showing the concept of the correction coefficient storage unit 116.

The correction coefficient storage unit 116 stores, in advance, the correction coefficients 115 (Wiener filter) corresponding to each combination of the capturing parameter 107, pixel position 114, and noise amount 112. FIG. 4 shows a stop value and a zoom position as examples of the capturing parameter 107. The OTF changes depending on the pixel position 114. When the OTF changes, the correction coefficients 115 also change. The correction coefficients 115 also depend on the noise amount 112.

The Wiener filter is a two-dimensional 3×3 digital filter, as indicated by the correction coefficients in FIG. 4. The Wiener filter forming method will be described later in detail.

There are an enormous number of combinations of the capturing parameter 107, pixel position 114, and noise amount 112. If the correction coefficients 115 corresponding to all combinations are stored, the data amount stored in the correction coefficient storage unit 116 becomes enormous. To prevent this, the correction coefficient storage unit 116 stores correction coefficients corresponding to the representative values of the capturing parameter 107, pixel position 114, and noise amount 112. Hence, the correction coefficient interpolation unit 113 acquires, from the correction coefficient storage unit 116, correction coefficients corresponding to representative values adjacent to the combination of the input capturing parameter 107, pixel position 114, and noise amount 112. Based on the correction coefficients, the correction coefficient interpolation unit 113 interpolates the correction coefficients 115 corresponding to the combination of the capturing parameter 107, pixel position 114, and noise amount 112.

For example, the representative values of the pixel position 114 are set at two points, i.e., an edge of the image and the center of the image. The correction coefficients 115 corresponding to arbitrary pixel positions 114 are approximately obtained by calculating the weighted average of the correction coefficients at the edge of the image and that at the center of the image.

The Wiener filter has been exemplified above. If blur correction such as the maximum entropy method or Richardson-Lucy method is used, the correction coefficients 115 correspond to the OTF and noise amount.

[Wiener Filter Forming Method]

The Wiener filter can be obtained by calculating the inverse Fourier transform of W given by $$W(u,v)=H^*(u,v)/\{|H(u,v)|^2+Sn(u,v)/Sf(u,v)\} \quad (5)$$

where

H*(u,v) is the complex conjugate of H(u,v) that is the OTF,
Sn(u,v) is the power spectrum of noise, and
Sf(u,v) is the power spectrum of the capturing image.

The Wiener filter is also given, by rewriting Sn(u,v) and Sf(u,v) of equation (5) into a simplified form free from dependence on the spatial frequency, by $$W(u,v)=H^*(u,v)/\{|H(u,v)|^2+SNR^2\} \quad (6)$$

where SNR is the SN ratio obtained by dividing the standard deviation of noise by the pixel value of the capturing image.

When calculating the standard deviation of noise in each region of the dark image 105, the pixel value to be used for division is the average pixel value in the corresponding region of the capturing image 104. Strictly speaking, the SNR is a quantity which depends on the pixel values of the correction target pixels. However, the average pixel value of the capturing image 104 may be used as a matter of expedience.

[Relationship between Noise Amount and Blur Correction]

Figure 5B:
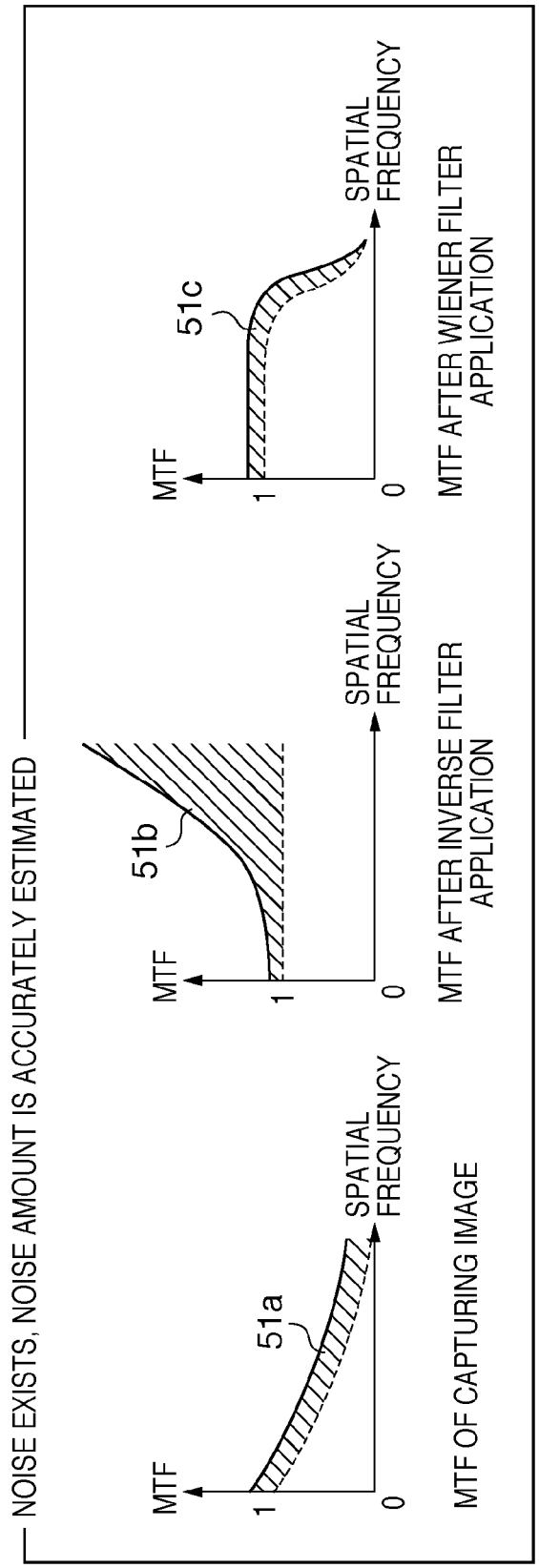

FIGS. 5A to 5C are graphs schematically showing the relationship between the noise amount and blur correction. The ordinate of each graph represents an MTF (Modulation Transfer Function) that is the absolute value of the OTF, and the abscissa represents the spatial frequency. Note that in FIGS. 5A to 5C, a point having a significant value other than 0 is regarded as an object (point source) for the descriptive convenience.

FIG. 5A shows graphs for explaining the MTF when no noise is present. The left graph of FIG. 5A shows the MTF of an object. If the imaging optical system 101 has no blur, the capturing image of the object exhibits the same MTF. The middle graph of FIG. 5A shows the MTF of a capturing image including the blur of the imaging optical system 101. The higher the frequency is, the smaller the value of the MTF is. Note that as the object is assumed to be a point source, the middle graph of FIG. 5A represents the MTF of the imaging optical system 101, too.

The right graph of FIG. 5A shows the MTF of a capturing image obtained by performing blur correction using an inverse filter for a capturing image corresponding to the middle graph of FIG. 5A. Within the range of MTF>0 in the middle graph of FIG. 5A, blur correction using the inverse filter can recover the capturing image to the same state as in the right graph of FIG. 5A. In fact, however, noise is present, and the frequency characteristic of noise is added to the MTF of the capturing image.

FIG. 5B shows graphs for explaining the MTF when noise is present, and accurate noise amount estimation is possible. A region 51a in the left graph of FIG. 5B represents the noise component added to the MTF of the capturing image. The middle graph of FIG. 5B shows the MTF of a capturing image obtained by performing blur correction using an inverse filter for a capturing image corresponding to the left graph of FIG. 5B. As indicated by a region 51b, the noise extremely increases in the high-frequency region.

The right graph of FIG. 5B shows the MTF of a capturing image obtained by performing blur correction using a Wiener filter for a capturing image corresponding to the left graph of FIG. 5B. The Wiener filter reduces the degree of correction in a frequency region where the ratio of the noise component to the MTF of the imaging optical system 101 rises. As a result, the degree of correction lowers in the high-frequency region where the ratio of the noise component is high. As indicated by a region 51c in the right graph of FIG. 5B, the increase of noise is suppressed.

In the low- and intermediate-frequency regions, the MTF shown in the right graph of FIG. 5B is nearly 1, and the blur is corrected in these frequency regions. That is, blur correction that obtains a capturing image corresponding to the MTF shown in the right graph of FIG. 5B is preferable because it moderately balances the effect of blur correction and the adverse effect of noise increase. To obtain such balance, it is necessary to accurately estimate the noise amount.

FIG. 5C shows graphs for explaining the MTF when noise is present, and accurate noise amount estimation is impossible. The left graph of FIG. 5C shows the MTF of a capturing image obtained by performing blur correction using a Wiener filter for a capturing image corresponding to the left graph of FIG. 5B. In this graph, the noise amount is estimated to be smaller than the actual amount. Since the noise amount is estimated to be smaller than the actual amount, the noise increases in the high-frequency region, as indicated by a region 52a.

The right graph of FIG. 5C shows the MTF of a capturing image obtained by performing blur correction using a Wiener filter for a capturing image corresponding to the left graph of FIG. 5B. In this graph, the noise amount is estimated to be larger than the actual amount. Since the noise amount is estimated to be larger than the actual amount, the MTF in the intermediate-frequency region lowers, and blur correction is insufficient, although the increase of noise is suppressed in the high-frequency region, as indicated by a region 52b.

[Preprocessing Unit]

The preprocessing unit 106 performs, for the capturing image 104, for example, gamma correction, demosicing (developing process), and processing of compensating for defects (pixel omission) in the image capturing device 102 as needed. The preprocessing unit 106 also executes preprocessing based on the dark image 105 for the capturing image 104. Although preprocessing based on the dark image 105 is not directly relevant to blur correction, it will be described as an example of using the dark image 105 for processing other than estimation of the noise amount 112.

When noise exists, a region of the capturing image 104 corresponding to the darkest region of the object also has a significant value other than 0. Consequently, the contrast lowers in the capturing image 104. The contrast decrease is reduced by subtracting the average pixel value of the dark image 105 from each pixel value of the capturing image 104. If the noise characteristic largely changes between regions, as shown in FIG. 3, the average pixel value is calculated in each region of the dark image 105 and subtracted from the pixel values in a corresponding region of the capturing image 104. If the noise characteristic changes depending on the pixel level, the dark image 105 itself is subtracted from the capturing image 104. Especially when a defective pixel that never takes the value 0 exists, it is preferable to subtract the dark image 105 from the capturing image 104.

As another preprocessing, noise reduction may be done based on the dark image 105. For example, a region with large noise is determined in the dark image 105, and stronger noise reduction is applied to a corresponding region of the capturing image 104. This enables noise reduction adaptive to the actual noise characteristic and enhances the effect of noise reduction of the capturing image 104. Since the capturing image 104 after noise reduction contains less noise, the preprocessing unit 106 needs to notify the noise amount estimation unit 111 of information about the reduced noise amount. The noise amount estimation unit 111 needs to correct the noise amount 112 based on the notification.

[Blur Correction Unit]

When executing blur correction using a Wiener filter, the blur correction unit 108 performs a convolution operation of the Wiener filter (correction coefficients 115) and the capturing image 104. When executing blur correction using a blur correction method such as the maximum entropy method or Richardson-Lucy method, a repetitive operation is performed using an OTF and noise amount corresponding to the correction coefficients 115, thereby correcting the blur of the capturing image 104.

Figure 6:
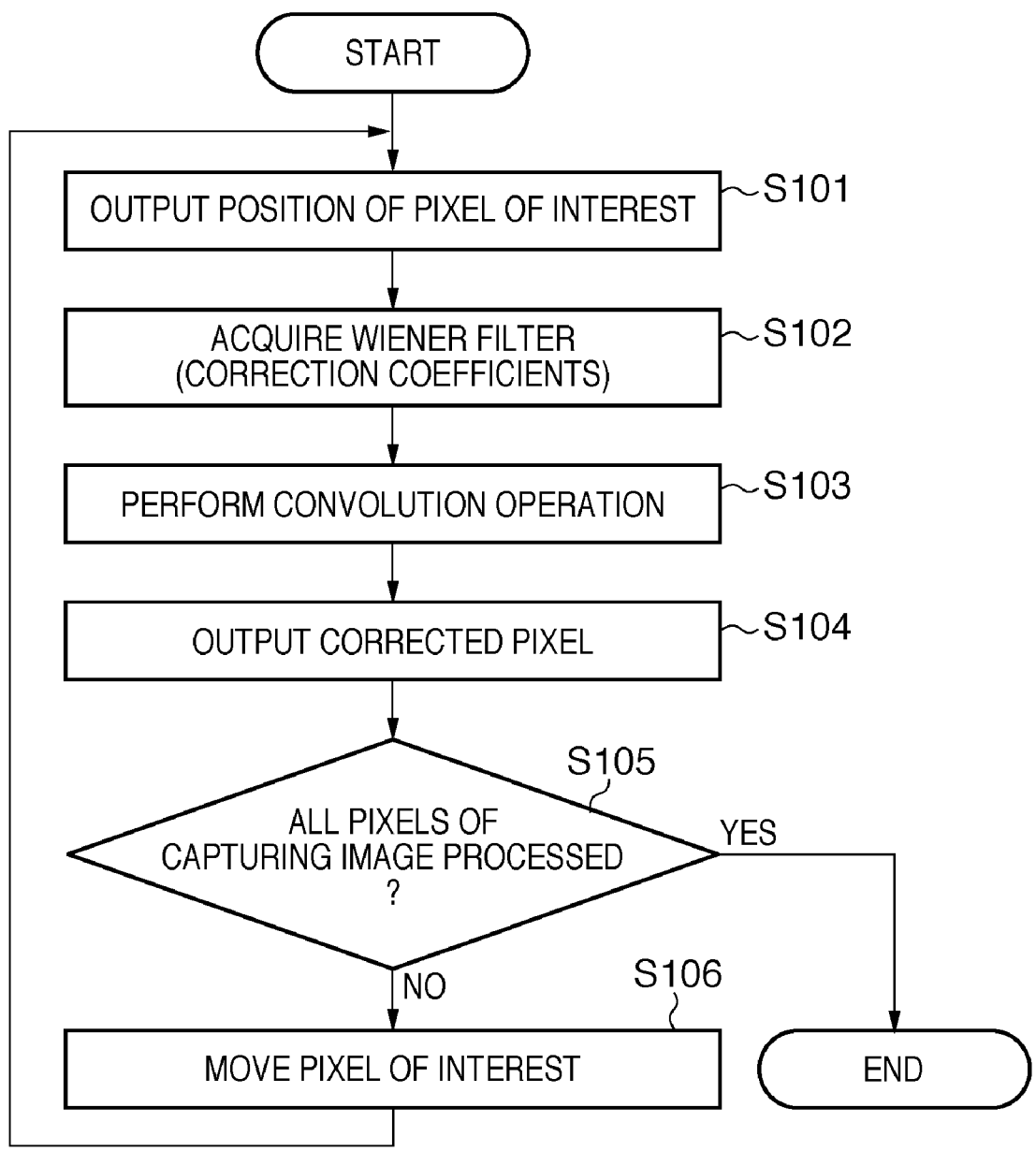
FIG. 6 is a flowchart for explaining processing of a blur correction unit.

FIG. 6 is a flowchart for explaining processing of the blur correction unit 108.

The blur correction unit 108 outputs the position of a pixel of interest of the capturing image 104 as the pixel position 114 (S101), and acquires the Wiener filter (correction coefficients 115) from the correction coefficient interpolation unit 113 (S102). The blur correction unit 108 then performs the convolution operation of the Wiener filter and 3×3 pixels centering around the pixel of interest (S103), and outputs a corrected pixel corresponding to the pixel of interest (S104).

Next, the blur correction unit 108 determines whether all pixels of the capturing image 104 have been processed (S105). If the processing has not ended yet, the pixel of interest is moved (S106), and the process returns to step S101. If all pixels have been processed, the blur correction ends.

In the above-described way, using the dark image 105 gives an accurate estimate of the noise amount 112 that varies depending on the capturing condition. When blur correction is performed using the accurately estimated noise amount 112 and the correction coefficients 115 associated with the blur characteristic of the imaging optical system 101, noise increase and the degree of blur correction can balance well. As a result, the blur caused by the imaging optical system 101 decreases, and the corrected image 110 in which noise increase is moderately suppressed can be obtained.

The degree of correction of each frequency component included in the capturing image 104 changes in accordance with the pixel position and the capturing condition. For example, at a pixel position where the noise amount is large or under a capturing condition with a high ISO sensitivity, the noise amount is large. As a result, the degree of correction of each frequency component of the capturing image 104 lowers. In this embodiment, the degree of correction of each frequency component is adaptively changed for a different noise characteristic in accordance with the pixel position and the capturing condition, thereby maintaining the balance between noise and the degree of blur correction.

Second Embodiment

Image processing according to the second embodiment of the present invention will be described below. Note that the same reference numerals as in the first embodiment denote the same parts in the second embodiment, and a detailed description thereof will not be repeated.

Shot noise is known as a noise generated when light strikes the light-receiving surface of an image capturing device 102. The shot noise is known to be proportional to the square root of light energy that enters photoelectric conversion elements.

The noise amount estimation unit 111 of the first embodiment calculates the noise amount 112 based on the dark image 105 and the capturing parameter 107. That is, the noise amount 112 of the first embodiment represents a noise amount when no light strikes the light-receiving surface of the image capturing device 102. In other words, the dark image 105 captured in a light block off state contains no information about shot noise.

In the second embodiment, a high noise estimation accuracy is attained in consideration of shot noise.

Figure 7:
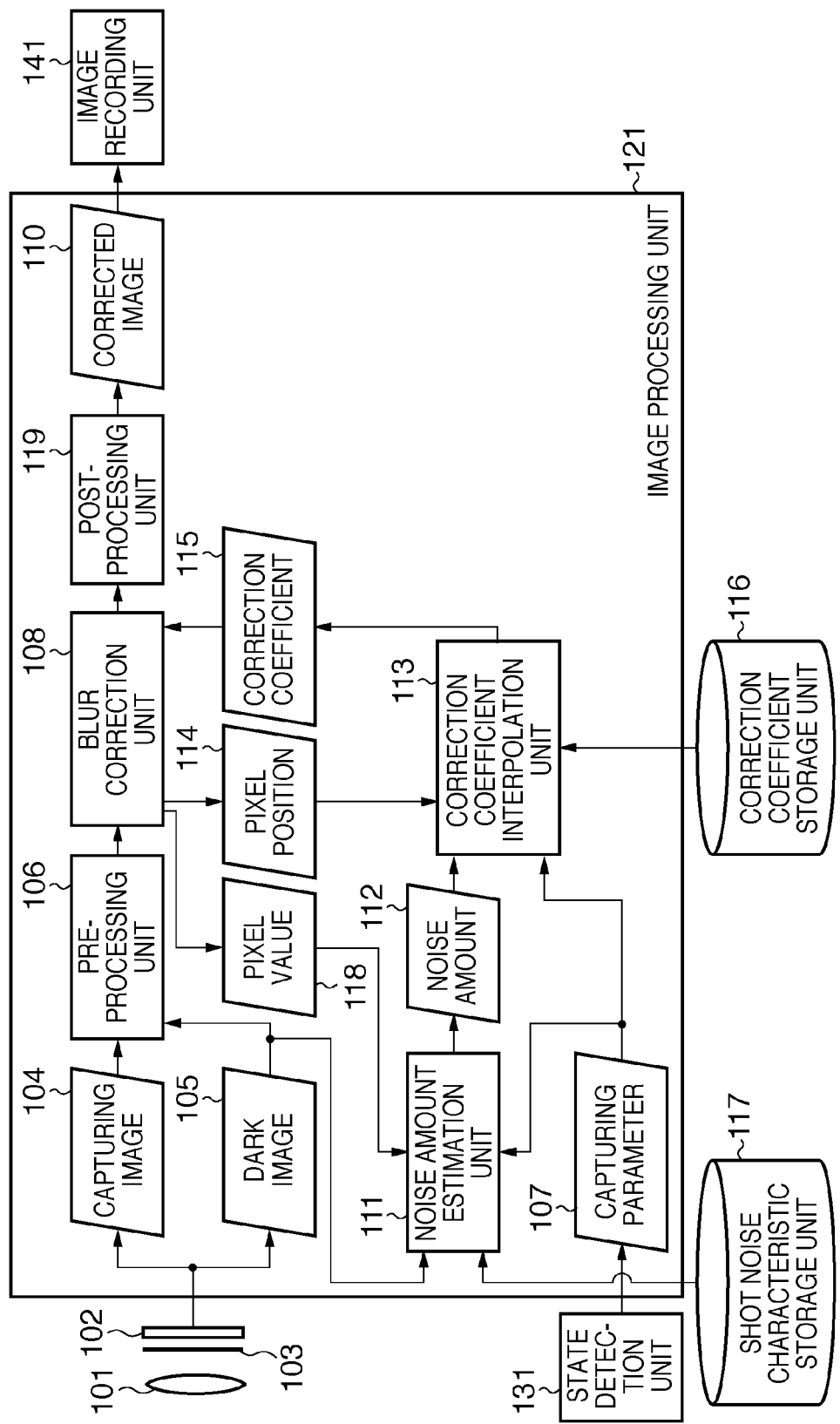
FIG. 7 is a block diagram showing the arrangement of an image capturing apparatus according to the second embodiment.

FIG. 7 is a block diagram showing the arrangement of an image capturing apparatus according to the second embodiment. Unlike the arrangement of the first embodiment shown in FIG. 1, a noise amount estimation unit 111 calculates a noise amount 112 based on a pixel value 118 of a capturing image 104 and information from a shot noise characteristic storage unit 117 in addition to a dark image 105 and a capturing parameter 107. The noise amount estimation unit 111 of the second embodiment estimates the noise amount 112 by $$STDt = \sqrt{(STDd^2 + STDs^2)} \quad (7)$$

where

STDt is the estimated noise amount,

STDd is the noise amount calculated from the dark image 105, and

STDs is the shot noise amount.

STDd is the standard deviation of the dark image 105, as in the first embodiment. STDs is determined by light energy. STDs can be obtained by calculating pixel values because the pixel values are determined by light energy. More specifically, the shot noise characteristic storage unit 117 stores a lookup table (LUT) representing the relationship between a pixel value and STDs, and STDs is obtained based on the pixel value 118 of a pixel of interest obtained from a blur correction unit 108. Note that STDt (noise amount 112) needs to be adjusted in accordance with the ISO sensitivity setting, as in the first embodiment.

The LUT of the shot noise characteristic storage unit 117 is created in the following way. An object having uniform brightness is captured. The correspondence between the shot noise amount and the pixel value is calculated based on the pixel values of the capturing image and the standard deviation of the pixel values, thereby generating a LUT.

Figure 8:
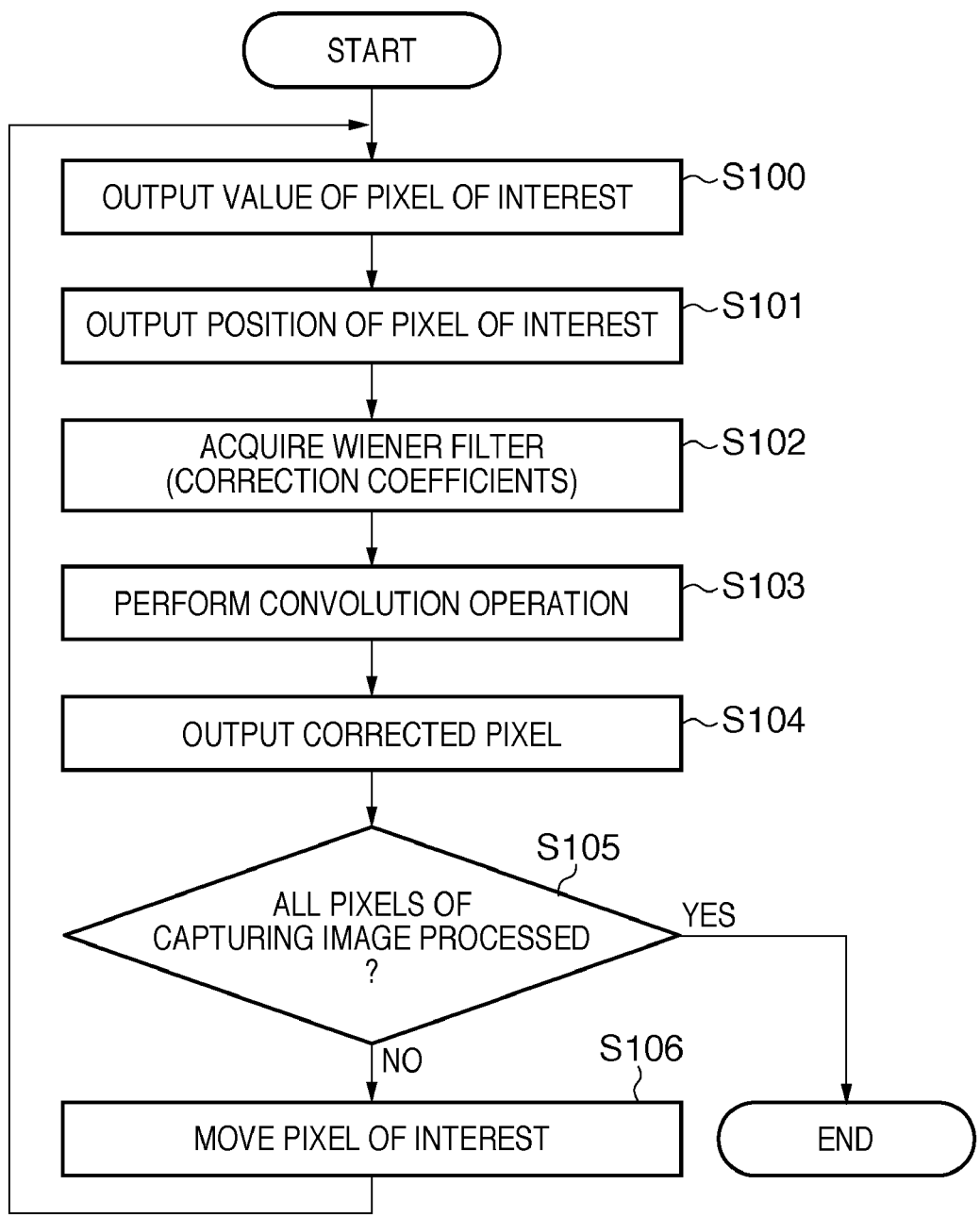
FIG. 8 is a flowchart for explaining processing of a blur correction unit according to the second embodiment.

FIG. 8 is a flowchart for explaining processing of the blur correction unit 108 according to the second embodiment. The blur correction unit 108 outputs the value of a pixel of interest of the capturing image 104 as the pixel value 118 (S100), and from then on, executes the same processes (S101 to S106) as in the first embodiment.

For example, the pixel value of a bright pixel is larger than noise, and the SNR is high. When the SNR is high, the degree of blur correction by a Wiener filter strengthens. Hence, a preferable result is obtained such that stronger blur correction is performed for a bright pixel. A pixel value in a dark portion of an image where noise is noticeable is not much larger than noise and has a low SNR. When the SNR is low, the degree of blur correction by a Wiener filter weakens. Hence, a preferable result of suppressing noise increase in the dark portion of the image is obtained.

According to the second embodiment, since the noise amount 112 changes in accordance with the pixel value 118, the Wiener filter may frequently change. If changing the Wiener filter is cumbersome, for example, a threshold may be set. When the pixel value exceeds this threshold, the predetermined pixel value 118 is output, thereby suppressing the frequent change of the Wiener filter in a bright portion of an image with a high SNR.

In the second embodiment, considering the shot noise characteristic storage unit 117, a memory of a larger storage capacity is necessary, as compared to the first embodiment. For this reason, the arrangement of the second embodiment is not suitable for an image capturing apparatus in which the shot noise amount is smaller than the noise amount obtained from the dark image 105. On the other hand, the arrangement is suitable for an image capturing apparatus in which the shot noise amount is larger than the noise amount obtained from the dark image 105.

Third Embodiment

Image processing according to the third embodiment of the present invention will be described below. Note that the same reference numerals as in the first and second embodiments denote the same parts in the third embodiment, and a detailed description thereof will not be repeated.

There exist commercially available image capturing apparatuses such as an electronic camera which records and plays back a still image or a moving image captured by a solid-state image capturing device such as a CCD or CMOS sensor while using, as a recording medium, a memory card having a solid-state memory device. Many of the image capturing devices of these electronic cameras include a plurality of pixels shaded by an aluminum film or the like and called OB (Optical Black) pixels. Image data output from the OB pixel range (to be referred to as an OB portion hereinafter) is called OB data.

Figure 9:
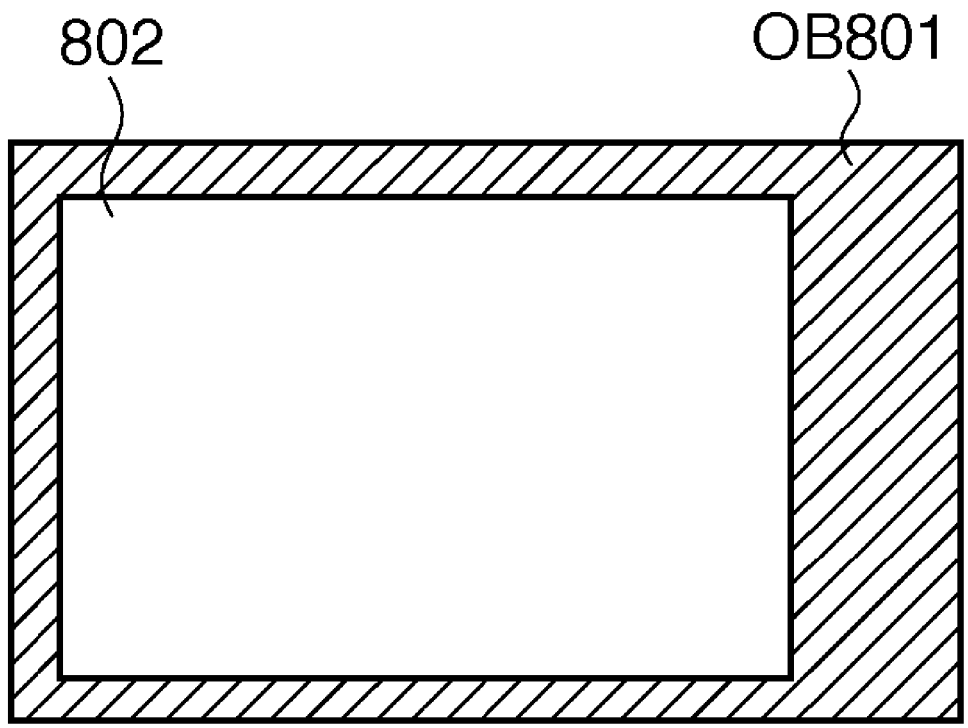
FIG. 9 is a view showing the concept of an OB portion.

FIG. 9 is a view showing the concept of an OB portion. An OB portion 801 is arranged adjacent to a capturing region 802 and used to define black of a capturing image. OB data has a significant value exceeding 0 due to noise. The average value of the OB data also exceeds 0. Considering that the same noise as the OB data is mixed in the capturing image as well, the pixel having the minimum value in the capturing image has not the value 0 but a value equal to or larger than the average value of OB data. Processing of subtracting the average value of OB data from a capturing image to correct the value of each pixel unexposed to light to almost 0 is known. This processing will be referred to as a black subtraction process hereinafter. Light to the OB portion 801 is already blocked off. For this reason, the use of the OB portion 801 makes the above-described shade unit 103 not always necessary.

Figure 10:
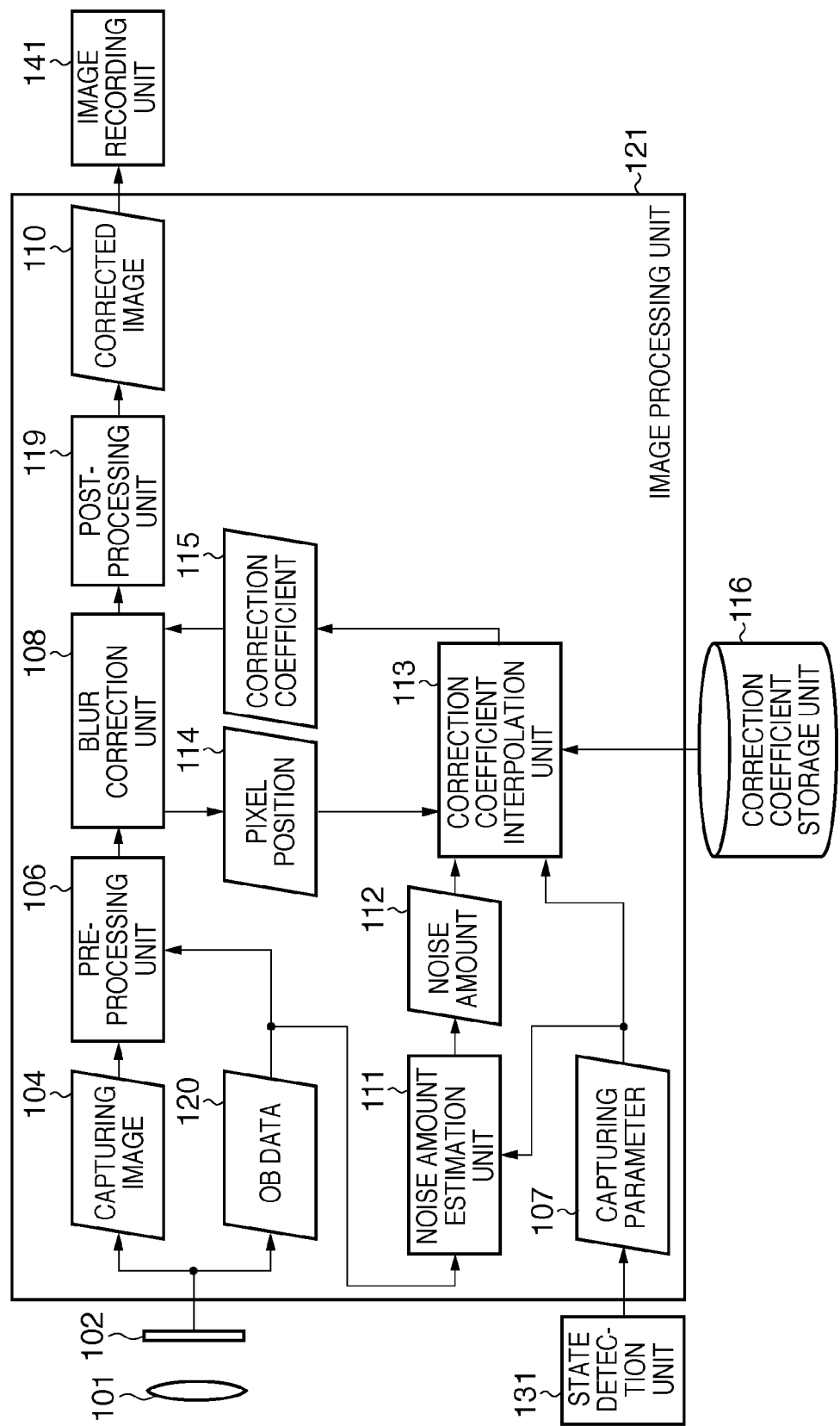
FIG. 10 is a block diagram showing the arrangement of an image capturing apparatus according to the third embodiment.

FIG. 10 is a block diagram showing the arrangement of an image capturing apparatus according to the third embodiment. Unlike the first embodiment shown in FIG. 1, the apparatus includes no shade unit 103, a preprocessing unit 106 performs the black subtraction process of subtracting the average value of OB data 120 from a capturing image 104 as one of preprocesses, and a noise amount estimation unit 111 estimates a noise amount 112 based on the OB data 120.

That is, an image processing unit 121 of the third embodiment uses the OB data 120 not only for the black subtraction process but also for estimation of the noise amount 112. More specifically, the noise amount estimation unit 111 uses the standard deviation of the OB data 120 as the noise amount 112.

Needless to say, the noise amount estimation unit 111 may estimate the noise amount in consideration of shot noise, as in the second embodiment. In this case, not all pixels of the OB portion 801 need be used. A noise amount STDd may be calculated from the OB data 120 of some pixels.

In the first and second embodiments, to estimate the noise amount 112, it is necessary to perform capturing for obtaining the capturing image 104 and capturing for obtaining the dark image 105 in a light block off state. In the third embodiment, the OB data 120 can be acquired from the OB portion 801 aside from capturing of the capturing image 104. This simplifies the processing procedure. However, since the OB portion 801 is located in a region different from the capturing region 802, it is impossible to accurately estimate the noise amount that changes between regions of the capturing image 104. In other words, the arrangement of the third embodiment is suitable for an image capturing apparatus in which the degree of noise amount change between regions of the capturing image 104 is low. However, the third and fourth embodiments can be combined.

Fourth Embodiment

Image processing according to the fourth embodiment of the present invention will be described below. Note that the same reference numerals as in the first to third embodiments denote the same parts in the fourth embodiment, and a detailed description thereof will not be repeated.

Figure 11:
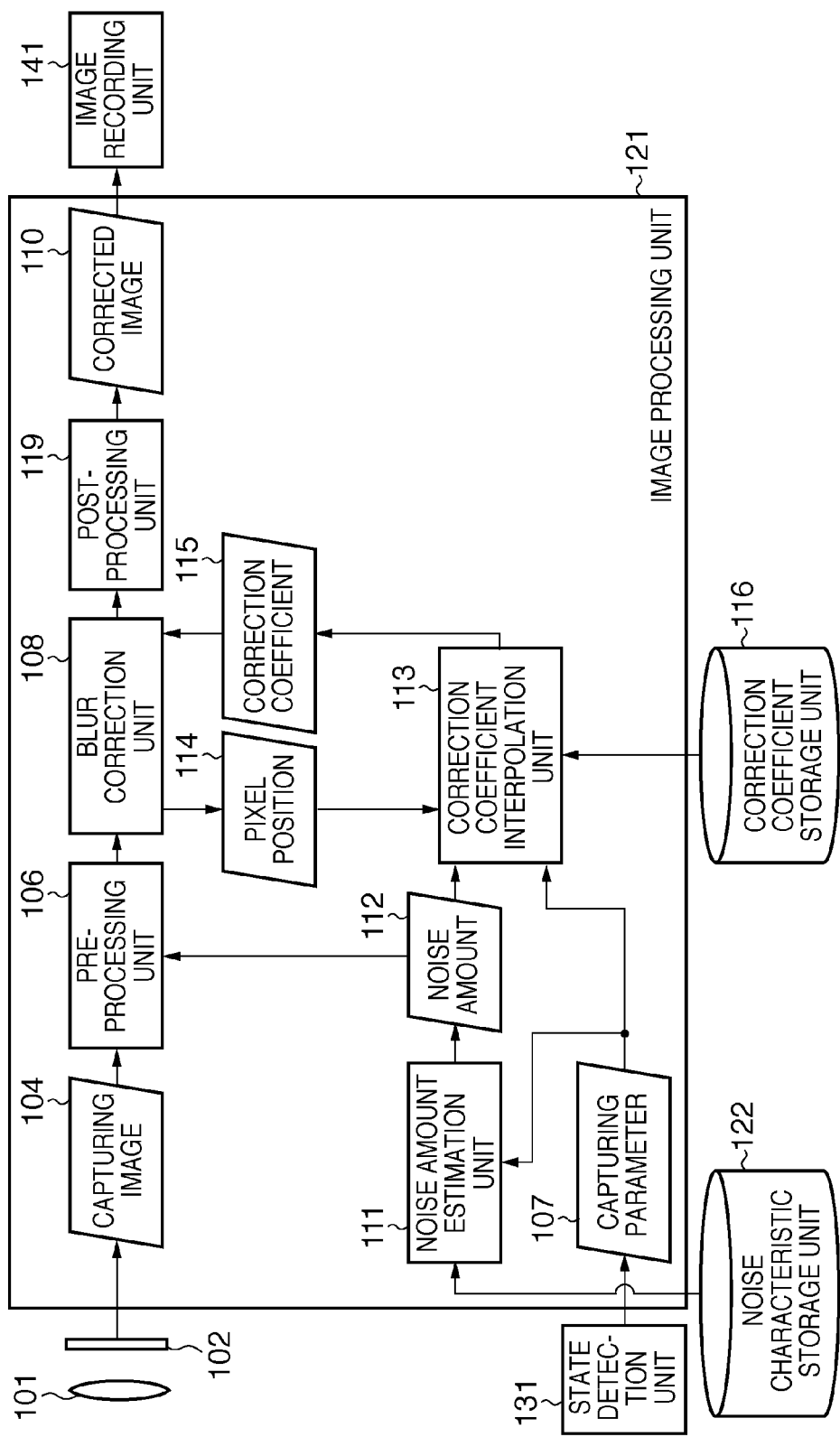
FIG. 11 is a block diagram showing the arrangement of an image capturing apparatus according to the fourth embodiment.

FIG. 11 is a block diagram showing the arrangement of an image capturing apparatus according to the fourth embodiment. Unlike the first embodiment shown in FIG. 1, the apparatus includes no shade unit 103, a preprocessing unit 106 performs a black subtraction process of a capturing image 104 based on a noise amount 112 as one of preprocesses, and the apparatus includes a noise characteristic storage unit 122 for estimation of the noise amount 112. The noise characteristic storage unit 122 stores the correspondence between a capturing parameter 107 and the noise amount 112. Hence, a noise amount estimation unit 111 acquires the noise amount 112 corresponding to the capturing parameter 107 from the noise characteristic storage unit 122.

Examples of the capturing parameter 107 associated with the noise amount 112 are the temperature, exposure time, and ISO sensitivity setting of an image capturing device 102. When estimating the noise amount 112 in consideration of shot noise, as in the second embodiment, the capturing parameter 107 needs to include the exposure amount or pixel value.

Figure 12:
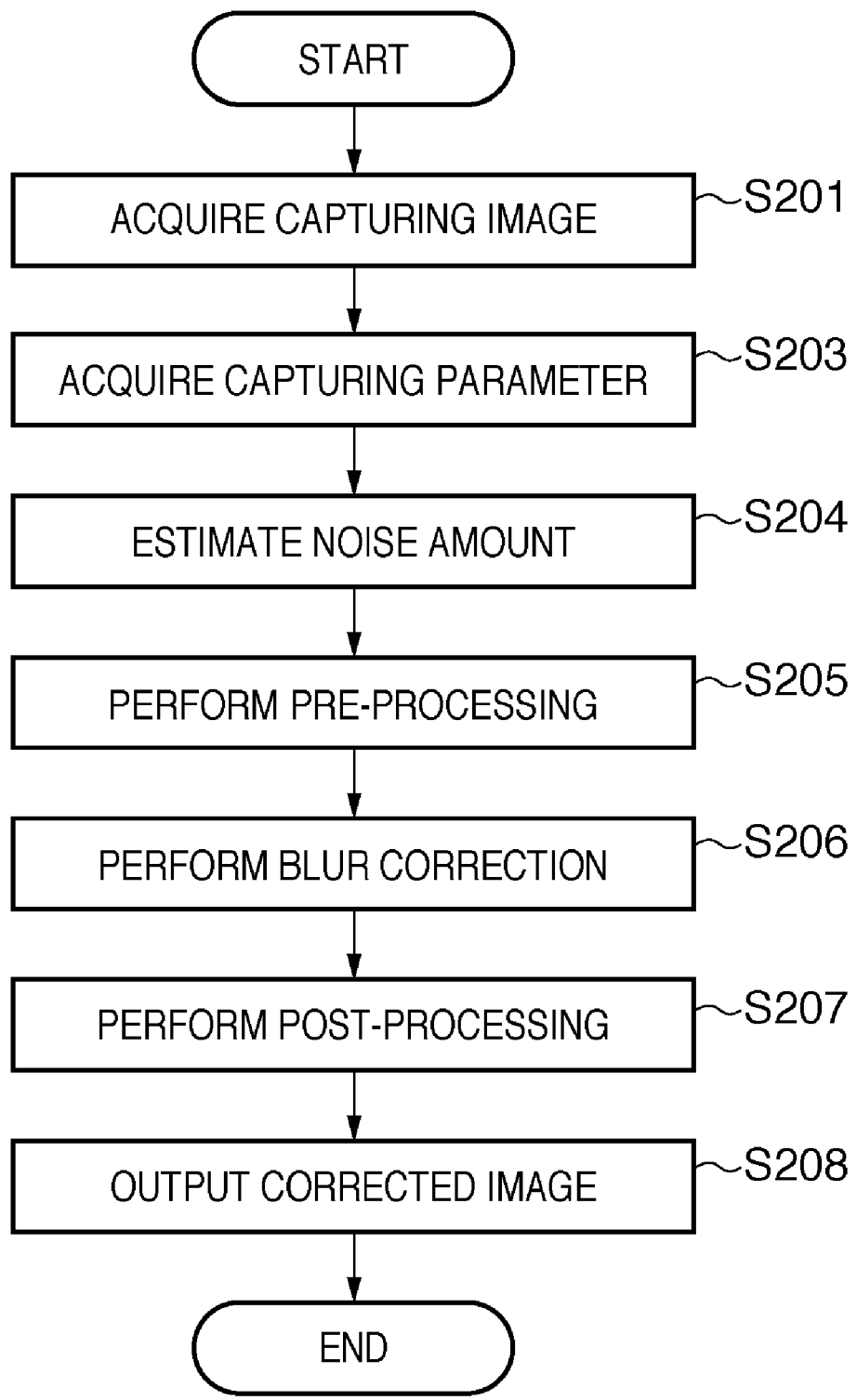
FIG. 12 is a flowchart for explaining image processing of an image processing unit according to the fourth embodiment.

FIG. 12 is a flowchart for explaining image processing of an image processing unit 121 according to the fourth embodiment. The processing does not include step S202 of acquiring a dark image 105, unlike the first embodiment shown in FIG. 2. FIG. 13 is a table showing the concept of the noise characteristic storage unit 122.

The noise characteristic storage unit 122 stores, as a LUT in advance, noise amounts corresponding to combinations of the capturing parameters 107, for example, combinations of the temperature, exposure amount, exposure time, and ISO sensitivity set value of the image capturing device 102. To create the LUT to be stored in the noise characteristic storage unit 122, the noise amount is measured in darkness for each combination of the capturing parameters 107.

When measuring the noise amount, if the value of each item of the capturing parameters 107 is set in small steps, the number of times of measurement is enormous, and the capacity necessary for storing the LUT also increases enormously. To prevent this, the step of the value of each item is preferably adjusted in accordance with the storage capacity of the memory mountable in the image capturing apparatus. For example, only the ISO sensitivity setting may be changed, and the remaining items may be fixed to predetermined values, or the noise amount measuring points may be limited to two. If the LUT of the noise characteristic storage unit 122 records no noise amount corresponding to the combination of the capturing parameters 107, the noise amount estimation unit 111 acquires a noise amount corresponding to a combination adjacent to the combination of the capturing parameters 107. The noise amount 112 corresponding to the combination of the capturing parameters 107 is interpolated from the noise amounts.

According to the fourth embodiment, a storage capacity for the noise characteristic value is necessary. However, since the noise amount 112 need not be calculated based on the dark image 105 or OB data 120, the calculation cost can be reduced.

Fifth Embodiment

Image processing according to the fifth embodiment of the present invention will be described below. Note that the same reference numerals as in the first to fourth embodiments denote the same parts in the fifth embodiment, and a detailed description thereof will not be repeated.

FIG. 14 is a block diagram showing the arrangement of an image capturing apparatus according to the fifth embodiment. Unlike the fourth embodiment shown in FIG. 12, the apparatus includes no noise characteristic storage unit 122. A noise amount estimation unit 111 of the fifth embodiment holds a formula for calculating a noise amount 112 from capturing parameters 107.

The formula held by the noise amount estimation unit 111 is obtained by modeling the relationship between the noise amount and a combination of the capturing parameters 107 shown in FIG. 13 using regression analysis or the like. Note that the most simple formula generating method is a method using repression analysis. However, for example, a physical model formula of noise may be used.

According to the fifth embodiment, the storage capacity for the noise characteristic value can be decreased as compared to the fourth embodiment. However, since the noise characteristic is approximated by the formula, the accuracy of estimating the noise amount 112 may lower due to an approximation error, as compared to the fourth embodiment.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-104548, filed Apr. 22, 2009, which is hereby incorporated by reference herein in its entirety.

What is claimed is:

1. An image processing apparatus comprising:
a first acquisition section, configured to acquire a capturing parameter and a capturing image obtained by an image capturing device which uses the capturing parameter;
a second acquisition section, configured to acquire, corresponding to (a) an optical transfer function of the image capturing device derived from the capturing parameter, and (b) a noise amount of the capturing image dependent on the capturing parameter, correction data to correct a blur of the capturing image,
wherein a first degree of correction by the correction data for a high noise amount is less than a second degree of correction by the correction data for a low noise amount.

2. The apparatus according to claim 1, further comprising a corrector configured to perform, for the capturing image, blur correction based on the correction data.

3. The apparatus according to claim 1, wherein the second acquisition section acquires, corresponding to (a) an optical transfer function of the image capturing device derived from the capturing parameter, and (b) the noise amount of the capturing image dependent on the capturing parameter, the correction data for each pixel of the capturing image to correct the blur of the capturing image.

4. The apparatus according to claim 1, wherein the second acquisition section acquires, corresponding to (a) an optical transfer function of the image capturing device derived from the capturing parameter, and (b) the noise amount of the capturing image dependent on the capturing parameter, the correction data to correct the blur of the capturing image using a calculator.

5. The apparatus according to claim 4, further comprising an input section configured to input dark image data output from the image capturing device in a state in which no light is input to the image capturing device,
wherein the second acquisition section calculates the noise amount contained in the capturing image by correcting, based on the capturing parameter, a noise amount acquired from the dark image data.

6. The apparatus according to claim 4, further comprising:
an input section, configured to input dark image data output from the image capturing device in a state in which no light is input to the image capturing device; and
a memory which stores a noise amount generated when light strikes a light-receiving surface of the image capturing device,
wherein the second acquisition section calculates the noise amount contained in the capturing image from a noise amount acquired from the dark image data, and the noise amount acquired from the memory based on the capturing parameter including a pixel value of a pixel of interest.

7. The apparatus according to claim 3, further comprising an input section configured to input image data output from a shaded pixel arranged in the image capturing device,
wherein the second acquisition section calculates the noise amount contained in the capturing image by correcting, based on the capturing parameter, a noise amount acquired from the image data.

8. The apparatus according to claim 1, further comprising a memory which stores correspondence between the capturing parameter and a noise amount,
wherein the second acquisition section acquires the noise amount contained in the capturing image from the memory based on the capturing parameter, and acquires the correction data for each pixel of the capturing image.

9. The apparatus according to claim 1, wherein the second acquisition section acquires the noise amount contained in each of pixels of interest of the capturing image by calculation based on the capturing parameter, and acquires the correction data for each pixels of the capturing image.

10. An image processing method performed by a processor, the method comprising:
using the processor to perform the steps of:
acquiring a capturing parameter and a capturing image obtained by an image capturing device which uses the capturing parameter;
acquiring correction data, corresponding to (a) an optical transfer function of the image capturing device derived from the capturing parameter, and (b) a noise amount of the capturing image dependent on the capturing parameter, to correct a blur of the capturing image,
wherein a first degree of correction by the correction data for a high noise amount is less than a second degree of correction by the correction data for a low noise amount.

11. A non-transitory computer-readable medium storing a computer-executable program for causing a computer to perform an image processing method, the method comprising the steps of:
acquiring a capturing parameter and a capturing image obtained by an image capturing device which uses the capturing parameter;
acquiring, corresponding to (a) an optical transfer function of the image capturing device derived from the capturing parameter, and (b) a noise amount of the capturing image dependent on the capturing parameter, correction data to correct a blur of the capturing image,
wherein a first degree of correction by the correction data for a high noise amount is less than a second degree of correction by the correction data for a low noise amount.

* * * * *